United States Patent Office 2,743,287
Patented Apr. 24, 1956

2,743,287

HYDROXYL COMPOUNDS OF THE STEROID SERIES AND PROCESS OF MAKING SAME

Leopold Ruzicka, Hans Heusser, and Oskar Jeger, Zurich, Switzerland, assignors to Ciba Pharmaceutical Products, Inc., Summit, N. J.

No Drawing. Application December 29, 1952, Serial No. 328,504

Claims priority, application Switzerland February 21, 1952

9 Claims. (Cl. 260—397.2)

This invention relates to the manufacture of 9:11-dihydroxy compounds of the steroid series which possess in the rings B and C the following structures:

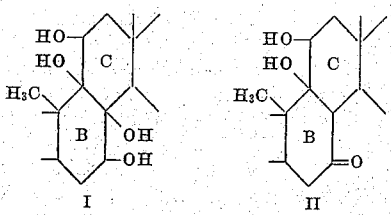

The compounds of type II can be converted in excellent yield into $\Delta^{8:9}$-7-keto-11-hydroxy-steroids by the action of alkali, preferably in a two-phase system.

The $\Delta^{8:9}$-7-keto-11-hydroxy steroids, are important intermediate products for the manufacture of steroids which are unsubstituted in the rings B and contain oxygen in 11-position. To this class of compounds belongs, for example, cortisone, which is $\Delta^4$-3:11:20-triketo-17$\alpha$:21-dihydroxy-pregnene.

Another object of this invention is a process by which the compounds of type I can be converted into compounds of type II.

The specified 9:11-dihydroxy compounds of the steroid series are obtained when isomerizing or hydrolyzing agents are reacted upon 7:11-dihydroxy-8:9-oxido-steroids and 7:8:9:11-tetrahydroxy steroids obtained are, if desired dehydrated to obtain 7-keto-9:11-dihydroxy steroids, preferably by treatment with alkali in a two-phase system.

The 7:11-dihydroxy-8:9-oxido steroids used as starting materials in the present case, belong to the cyclopentanopolyhydrophenanthrene or polyhydrochrysene series. Especial importance is attached to the derivatives of ergostane, cholestane, coprostane, sitostane, stigmastane, spirostane, cholane, allocholane, pregnane, androstane and aetiocholane. In addition, the starting materials may be substituted in the nucleus or in the side chain, for example in 3, 5, 6, 17, 20- and/or 21-position, by free or functionally converted hydroxyl groups or oxo groups, such as acyloxy groups, for example acetoxy, propionyloxy, benzoyloxy or tosyloxy groups, by alkoxy groups, for example methoxy or ethoxy groups, by acetalized oxo groups, by free or functionally converted carboxyl groups, such as nitrile or esterified carboxyl groups or a lactone group, for example butenolide group. The starting materials may have any desired configurations and can also contain double bonds, as for example in 5:6- or 22:23-position.

The starting materials of the present application are easily available by treatment of $\Delta^{8:9}$-unsaturated steroids, which contain in the positions 7 and 11 free or functionally converted hydroxyl groups, with oxidizing agents, as for example chromium trioxide or organic or inorganic peracids.

As hydrolyzing agents there can be used dilute inorganic acids, for example sulfuric acid, in the presence of solvents such as alcohols, ketones and organic acids, as for example acetic acid.

As isomerizing or dehydrating agents there are especially suitable more or less concentrated inorganic and organic acids or their anhydrides, for example formic acid, trichloracetic acid, hydrogen bromide, oxides or halides of phosphorus, such as phosphorus pentoxide or phosphorus tribromide, boron trifluoride, inorganic salts, for example zinc chloride, ferric chloride or potassium bisulfate, and alkaline reacting agents, such as alkalies, alkaline earths or alumina.

A two-phase system is understood to mean a reaction medium containing liquids which are not miscible with one another in all proportions, such as a mixture of aqueous caustic potash solution and dioxane.

The products of this invention are intended for therapeutic application or for use as intermediate products for the manufacture of therapeutically useful compounds.

The following examples illustrate the invention, the relation between part by weight and part by volume being the same as that between the gram and the cubic centimeter:

Example 1

1.1 parts by weight of $\Delta^{22:23}$-3$\beta$-acetoxy-7:11-dihydroxy-8:9-oxido-ergostene are dissolved in a mixture of 80 parts by volume of glacial acetic acid and 80 parts by volume of dioxane and treated with 0.3 part by volume of 2 N-sulfuric acid. The solution is maintained for 16 hours at 20° C. and then diluted with a large quantity of ether. The ethereal layer is washed four times with water, sodium bicarbonate solution and water, dried and evaporated. The residue yields from acetone-hexane, followed by recrystallization from methanol-water, pure $\Delta^{22:23}$-3$\beta$-acetoxy-7:8:9:11-tetrahydroxy-ergostene of M. P. 250-252° C. ($[\alpha]_D = +8°$ in chloroform); yield 90 per cent. This compound can be converted to cortisone as follows: Thus in Example 5 there is disclosed the conversion of $\Delta^{22:23}$ - 3$\beta$ - acetoxy - 7:8:9:11 - tetrahydroxy - ergostene to $\Delta^{22:23}$-3$\beta$-acetoxy-7-keto-9:11-dihydroxy-ergostene and the conversion of the latter to $\Delta^{8:9:22:23}$-3$\beta$,11-diacetoxy-7-keto-ergostadiene (VI) described in Chemistry and Industry (1951) pages 1035 and 1036. This article shows the conversion of the latter compound to 7:11-diketo-ergost-22-en-3-$\beta$-yl-acetate (VII). From (VII), as shown by Tishler et al., JACS vol. 73, 2396–7 (1951), there is obtained 11:20 - diketo - allo - pregnane - 3 - $\beta$ - yl-acetate, which as shown by Chemerda et al., JACS vol. 73, 4052 (1951) and Rosenkrantz et al., JACS vol. 73, 4055 (1951) has been converted to cortisone.

The $\Delta^{22:23}$ - 3$\beta$ - acetoxy - 7:11 - dihydroxy - 8:9-oxido-ergostene used as starting material, can be prepared as follows:

5 parts by weight of $\Delta^{8:9:22:23}$-3$\beta$-acetoxy-7:11-dihydroxy-ergostadiene are dissolved in 800 parts by volume of pure dioxane and treated with 67 parts by volume of ethereal monoperphthalic acid containing, per part by volume, 0.051 part by weight of active oxygen. The reaction solution is maintained for 38 hours at 20° C. in the dark and then diluted with ether, the ethereal solution washed with water, sodium bicarbonate solution and again with water, dried and evaporated. The residue yields from methanol-water 4.1 parts by weight of $\Delta^{22:23}$-3$\beta$ - acetoxy - 7:11 - dihydroxy - 8:9 - oxido - ergostene in the form of fine needles which melt at 147–148° C. ($[\alpha]_D = +15.5°$ in chloroform).

$\Delta^{22:23}$-3$\beta$-acetoxy-7:11-dihydroxy-8:9-oxido - ergostene can also be prepared by treating $\Delta^{8:9:22:23}$-3$\beta$-acetoxy-7:11-dihydroxy-ergostadiene in glacial acetic acid solution carefully with the quantity of chromium trioxide corresponding to one equivalent. The $\Delta^{22:23}$-3$\beta$:7:11- triacetoxy-8:9-oxido-ergostene, prepared from $\Delta^{22:23}$-$3\beta$-acetoxy-7:11-dihydroxy-8:9-oxido-ergostene by acetylation in pyridine-acetic anhydride, melts at 159–161° C.; $[\alpha]_D = +6°$ (in chloroform).

*Example 2*

3 parts by weight of $\Delta^{22:23}$-$3\beta$-acetoxy-7:11-dihydroxy-8:9-oxido-ergostene are dissolved in 300 parts by volume of absolute benzene, treated with 10 parts by volume of boron trifluoride-ether complex and the whole maintained for two hours at 20° C. After standing for a short time, well formed leaflets separate from the solution. For working up, the solution is diluted with ether, washed with water, sodium bicarbonate solution and water, dried and evaporated. The residue yields from methanol-water 2.5 parts by weight of $\Delta^{22:23}$-$3\beta$-acetoxy-7-keto-9:11-dihydroxy-ergostene of M. P. 269° C. ($[\alpha]_D = -62°$ in chloroform).

The semicarbazone of this compound melts at 247–249° C. with decomposition.

The $\Delta^{22:23}$-$3\beta$:11-diacetoxy-7-keto-9-hydroxy-ergostene, obtained by acetylation with acetic anhydride in pyridine, melts at 191° C.; $[\alpha]_D = -45°$ (in chloroform).

*Example 3*

3 parts by weight of $\Delta^{22:23}$-$3\beta$-acetoxy-7:11-dihydroxy-8:9-oxido-ergostene are dissolved in 800 parts by volume of glacial acetic acid and maintained together with 100 parts by volume of 2 N-sulfuric acid for 16 hours at 20° C., then for one hour at 40° C. The customary working up of the reaction mixture yields 2 parts by weight of the $\Delta^{22:23}$-$3\beta$-acetoxy-7-keto-9:11-dihydroxy-ergostene, described in Example 2, of M. P. 269° C.

This substance can be converted into the $\Delta^{8:9:22:23}$-$3\beta$,11-dihydroxy-7-keto-ergostadiene, advantageously in the following manner:

0.5 part by weight of $\Delta^{22:23}$-$3\beta$-acetoxy-9:11-dihydroxy-7-keto-ergostene is dissolved in 75 parts by volume of dioxane and treated with a solution of 2.5 parts by weight of potassium hydroxide in 25 parts by volume of water, whereby two layers form. The reaction mixture is then boiled under reflux for 2½ days. The cooled solution is diluted with much ether and washed until neutral with water. The crude product obtained yields from acetone 0.34 part by weight of needles which melt at 207–208° C. After recrystallization three times, the pure $\Delta^{8:9:22:23}$-$3\beta$:11-dihydroxy-7-keto-ergostadiene melts at 209–210° C.; $[\alpha]_D = -2°$ (in chloroform).

In ethanol solution, the compound shows in the ultraviolet absorption spectrum a maximum at 253 m$\mu$, log $\epsilon = 3.91$.

*Example 4*

1 part by weight of $\Delta^{22:23}$-$3\beta$-acetoxy-7:11-dihydroxy-8:9-oxido-ergostene is dissolved in 15 parts by volume of glacial acetic acid and treated with 1 part by volume of an aqueous 48 per cent. hydrogen bromide solution. The reaction solution at first becomes colored violet, then dark green, whereupon crystals commence to separate. After an hour, the solution is diluted with water and extracted with ether. The customary working up of the ethereal layer yields a crude product of M. P. 264° C. By a single recrystallization from methanol-water, 0.94 part by weight is obtained of pure $\Delta^{22:23}$-$3\beta$-acetoxy-7-keto-9:11-dihydroxy-ergostene of M. P. 269° C.

*Example 5*

8 parts by weight of $\Delta^{22:23}$-$3\beta$-acetoxy-7:8:9:11-tetrahydroxy-ergostene are dissolved in 120 parts by volume of glacial acetic acid and maintained together with 8 parts by volume of an aqueous 48 per cent. hydrogen bromide solution, for one hour at 20° C. The working up follows as described in Example 4. After recrystallization from methanol-water, the reaction product melts at 269° C. It is $\Delta^{22:23}$-$3\beta$-acetoxy-7-keto-9:11-dihydroxy-ergostene, and can be converted into the $\Delta^{8:9:22:23}$-$3\beta$,11-diacetoxy-7-keto-ergostadiene as follows:

5 parts by weight of $\Delta^{22:23}$-$3\beta$-acetoxy-7-keto-9:11-dihydroxy-ergostene are dissolved in 1500 parts by volume of dioxane and, together with 500 parts by volume of 10 per cent. aqueous caustic potash solution, boiled for 62 hours under reflux. The solution is diluted with a large quantity of ether and the ethereal layer worked up in the customary manner. The crude product obtained yields, after subsequent acetylation, 5 parts by weight of crude $\Delta^{8:9:22:23}$-$3\beta$:11-diacetoxy-7-keto-ergostadiene, which, after recrystallization from methanol, yields 4.5 parts by weight of the pure preparation of M. P. 184–185° C.; $[\alpha]_D = +12°$ (in chloroform); (ultraviolet absorption in absolute alcohol: $\lambda$ max.$=253$ m$\mu$; log $\epsilon = 4.01$).

*Example 6*

0.63 part by weight of $3\beta$:$17\beta$-diacetoxy-7:11-dihydroxy-8:9-oxido-androstane is dissolved in 40 parts by volume of absolute benzene, treated with 0.1 part by volume of boron trifluoride-ether complex and the whole allowed to stand for 4 hours at room temperature. The yellow solution is diluted with 50 parts by volume of chloroform and washed with water, sodium bicarbonate solution and water, dried and evaporated. The solid residue (0.58 part by weight) is recrystallized from methanol. The $3\beta$:$17\beta$-diacetoxy-7-keto-9:11-dihydroxy-androstane is obtained of M. P. 267.5–268° C.; $[\alpha]_D = -75°$ in chloroform. The substance exhibits in the ultraviolet spectrum a wide maximum at 285 m$\mu$, log $\epsilon = 1.52$.

It can be converted into the $\Delta^{8:9}$-$3\beta$:$11\alpha$:$17\beta$-trihydroxy-7-keto-androstane as follows:

0.37 part by weight of $3\beta$:$17\beta$-diacetoxy-7-keto-9:11-dihydroxy-androstane is dissolved in 30 parts by volume of dioxane, treated with a solution of 0.75 part by weight of potassium hydroxide in 15 parts by volume of water and the whole heated for 6 hours with stirring to 80° C. After cooling, acidification is carried out with 1 part by volume of glacial acetic acid and the reaction solution is evaporated under vacuum to dryness. The residue is subjected to grinding with 5 parts by volume of water. The insoluble material is then filtered off and washed with a little water. After recrystallization from a mixture of methanol and water, the filter residue yields $\Delta^{8:9}$-$3\beta$:$11\alpha$:$17\beta$-trihydroxy-7-keto-androstene of M. P. 263–267° C.; $[\alpha]_D = -25°$ in alcohol. The substance exhibits in the ultraviolet absorption spectrum a maximum at 254 m$\mu$; log $\epsilon = 3.99$.

Acetylation with pyridine and acetic anhydride leads to $\Delta^{8:9}$-$3\beta$:$11\alpha$:$17\beta$-triacetoxy-7-keto-androstene of M. P. 143–145° C.; absorption maximum at 252 m$\mu$; log $\epsilon = 4.02$.

The $3\beta$:$17\beta$-diacetoxy-7:11-dihydroxy-8:9-oxido-androstane used as starting material can be prepared as follows:

0.81 part by weight of $\Delta^{8:9}$-$3\beta$:$17\beta$-diacetoxy-7:11-dihydroxy-androstene is dissolved in 40 parts by volume of absolute dioxane and treated with 4.25 parts by volume of an ethereal solution of monoperphthalic acid containing 0.0347 part by weight of active oxygen per part by volume and the whole allowed to stand for 5 days in the dark at $+3°$ C. Dilution is then carried out with 100 parts by volume of chloroform, followed by washing with 0.25-normal sodium bicarbonate solution and water, drying and evaporation under vacuum. 0.88 part by weight is obtained of an oily residue which, on grinding with ether, crystallizes. It is the crude $3\beta$:$17\beta$-diacetoxy-7:11-dihydroxy-8:9-oxido-androstene which can be recrystallized from ether. The pure substance melts at 186–187° C.; $[\alpha]_D = +10°$ in chloroform.

What is claimed is:
1. A process which comprises reacting a 7:11-dihydroxy-8:9-oxido steroid of the formula:

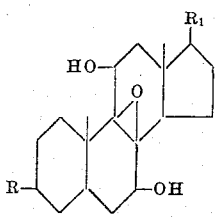

where R stands for a hydrocarbon carboxylic acid radical containing from 2–7 carbon atoms and $R_1$ stands for a member of the group consisting of a hydrocarbon carboxylic acid radical containing 2–7 carbon atoms and the ergostene side chain, with a mineral acid so as to produce the corresponding 7:8:9:11-tetrahydroxy and 9:11-dihydroxy-7-keto compounds.

2. A process which comprises reacting a $\Delta^{22:23}$-3-R-7:11-dihydroxy-8:9-oxido-ergostene, R being a hydrocarbon carboxylic acid radical containing 2–7 carbon atoms, with a mineral acid so as to produce the corresponding 7:8:9:11 - tetrahydroxy and 9:11 - dihydroxy - 7 - keto compounds.

3. A process according to claim 2, wherein the starting compound is $\Delta^{22:23}$-3-acetoxy-7:11-dihydroxy-8:9-oxido-ergostene.

4. A process which comprises reacting a 7:11-dihydroxy-8:9-oxido steroid of the formula:

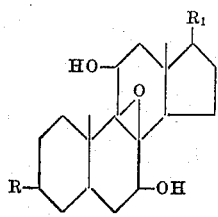

wherein R stands for a hydrocarbon carboxylic acid radical containing from 2–7 carbon atoms and $R_1$ stands for a member of the group consisting of a hydrocarbon carboxylic acid radical containing 2–7 carbon atoms and the ergostene side chain, with a member of the group consisting of a mineral acid and boron trifluoride so as to produce the corresponding 9:11-dihydroxy-7-keto compounds.

5. A process according to claim 4, wherein the starting compound is $\Delta^{22:23}$-R-7:11-dihydroxy-8:9-oxido-ergostene, R being a hydrocarbon carboxylic acid radical containing 2–7 carbon atoms.

6. A process according to claim 4, wherein the starting compound is $\Delta^{22:23}$-3-acetoxy-7:11-dihydroxy-8:9-oxido-ergostene.

7. A process which comprises reacting a $\Delta^{22:23}$-3-R-7:8:9:11-tetrahydroxy-ergostene, wherein R stands for a hydrocarbon carboxylic acid radical containing 2–7 carbon atoms, with a member of the group consisting of a mineral acid and boron trifluoride so as to produce the corresponding 9:11-dihydroxy-7-keto compounds.

8. $\Delta^{22:23}$-3-R-7:8:9:11-tetrahydroxy-ergostene, wherein R stands for a hydrocarbon carboxylic acid radical containing 2–7 carbon atoms.

9. $\Delta^{22:23}$-3$\beta$-acetoxy-7:8:9:11-tetrahydroxy-ergostene.

References Cited in the file of this patent
UNITED STATES PATENTS
2,602,769    Murray _____ July 8, 1952